April 12, 1949.  F. W. BOULWARE  2,467,250
CHICKEN FEEDER
Filed Sept. 13, 1945  2 Sheets-Sheet 1
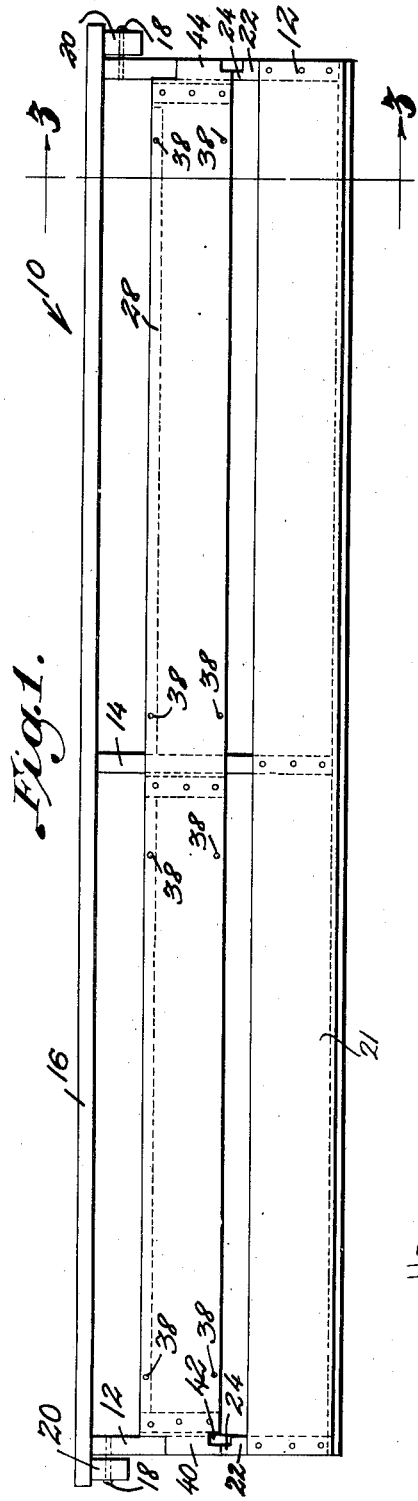
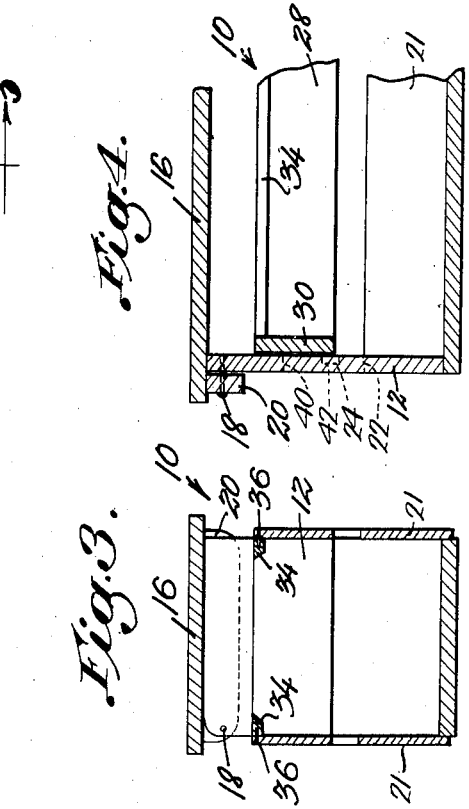
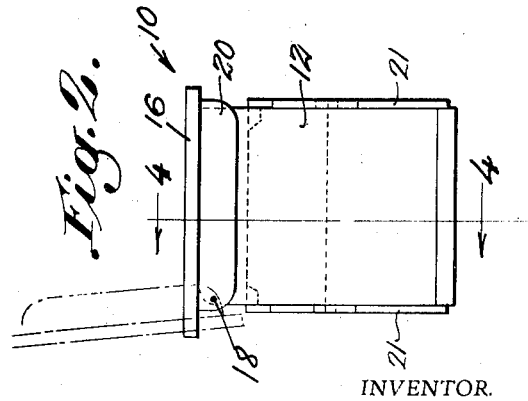
INVENTOR.
Finis W. Boulware
BY Victor J. Evans & Co.
ATTORNEYS

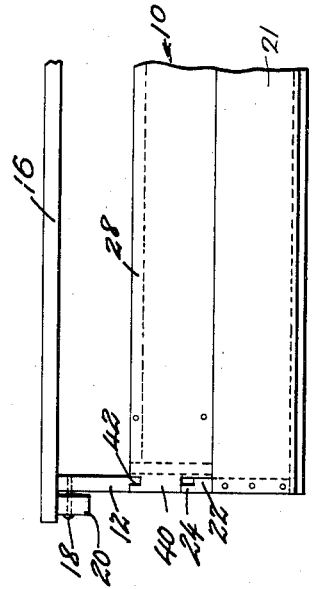
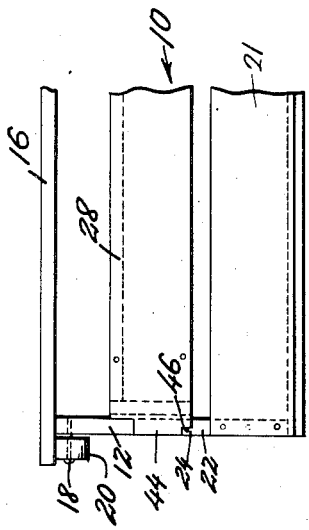
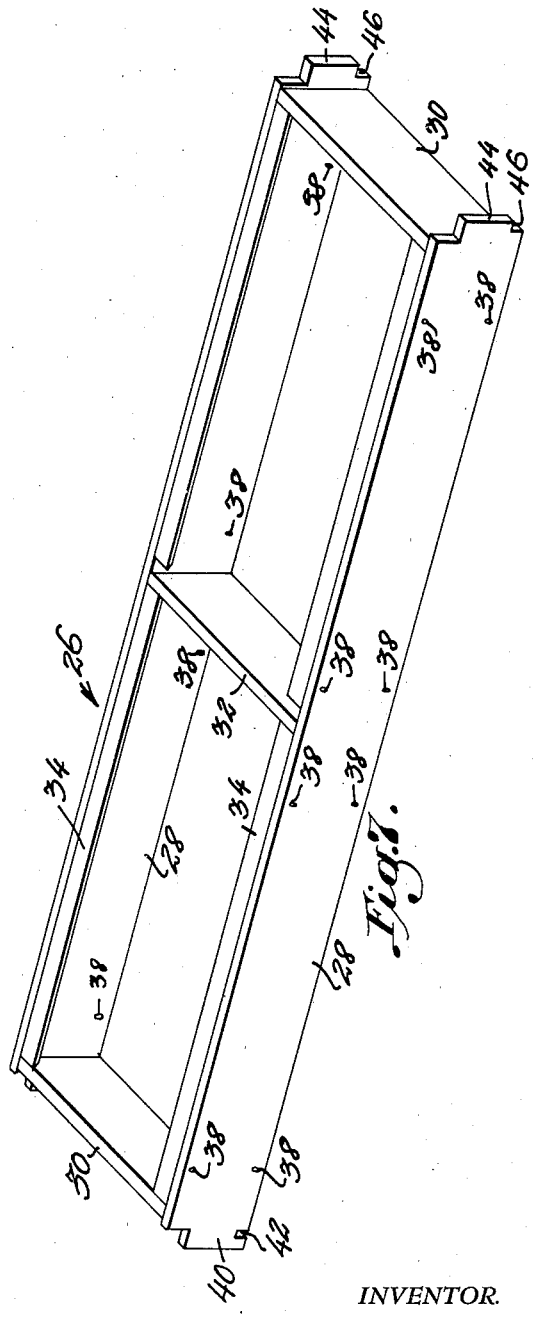

Patented Apr. 12, 1949

2,467,250

UNITED STATES PATENT OFFICE 2,467,250

CHICKEN FEEDER

Finis W. Boulware, Hatton, Mo.

Application September 13, 1945, Serial No. 616,115

1 Claim. (Cl. 119—61)

This invention relates to chicken feeders that by their construction can be used to feed chickens from one day old until they become hens.

An object of this invention is to provide a feeder that is simple and can be easily adjusted to accommodate the growth of the chickens from one day old up to the time they become hens.

A further object of the invention is to provide a feeder that is rugged, compact and inexpensive to construct.

With these and other objects and advantages in view, the invention consists of the novel details of construction, arrangement and combination of parts more fully hereinafter described, claimed and illustrated in the accompanying drawings in which—

Figure 1 is an elevational view of an embodiment of the invention;

Figure 2 is an end view thereof showing the lid closed and in raised position in dotted lines;

Figure 3 is a sectional view on the line 3—3 of Figure 1;

Figure 4 is a sectional view on the line 4—4 of Figure 2;

Figure 5 is a detailed fragmentary view of the feeder set for day old chickens;

Figure 6 is a detailed fragmentary view of the feeder set for chickens from five weeks old to maturity, and Figure 7 is a perspective view of the feed gauge frame for the feeder.

Referring in detail to the drawings, the numeral 10 designates an open top feed trough which can be made of wood, metal or any other suitable material.

A pair of spaced upstanding walls 12 form the ends of the trough 10 while a third upstanding wall 14 is mounted in the trough centrally of its end walls 12. The upper ends of the walls 12 and 14 terminate in a common plane and are straight across at the top.

A top or cover 16 is mounted for pivotal movement on the end walls 12 by means of pivot pins 18 which are mounted in transversely extending hinge portions 20 which are secured to the cover 16 adjacent the ends thereof and when the cover 16 is closed are positioned on the outer sides of the end walls 12.

Positioned on top of the sides 21 of the trough and secured to the end walls 12 are feed gauge frame supporting blocks 22. The blocks are positioned on the front and rear edges of the walls 12 and are provided with upstanding lugs 24 on the left hand edge of said blocks.

In order to provide for feeding chickens of various sizes and ages, the trough 12 is provided with a removable feed gauge frame 26 which comprises longitudinal sides 28 transverse ends 30 and a partition or wall 32 mounted between the sides 28 intermediate of and parallel to the ends 30. The wall 32 is so mounted that in one position it will contact the left side of the wall 14 and in reversed position will contact the right side of the wall 14.

Interposed between the ends 30 and partition 32, the sides 28 are provided with downwardly sloping removable feed saving ledges 34 which are secured to the sides 28 adjacent the upper edges thereof by means of pins 36 entering openings 38.

The left hand end of the frame 26 is provided with integral projections 40 which extend beyond the sides of the frame and are adapted to rest on the blocks 22. The bottoms of the projections 40 are provided with recesses 42, the purpose of which will be later explained.

The opposite ends of the frame are also provided with projections 44 but in this instance, the recesses 46 are cut at the lowermost end thereof.

The use of the frame 26 for feeding purposes is as follows:

With the frame set as shown in Figure 5, wherein the recesses 42 and recesses 46 co-act and receive therein the lugs 24 the frame is set for chickens one day old up to approximately three weeks old since the clearance between the sides of the trough and the frame is approximately one inch, thus the chickens can feed yet cannot climb into the trough.

With the frame set as shown in Figure 1 wherein the projections 40 and 44 rest on the lugs 24 the frame is set for chickens three to five weeks old, and with the frame set as shown in Figure 6, the frame is positioned in the trough in a reversed position from that shown in Figure 5 and the feeder is set for chickens from five weeks old to maturity.

Thus, the clearance for chickens from three to five weeks old has been widened and for chickens from five weeks to maturity has been eliminated since these chickens feed over the edges of the frame.

Therefore, the structure as described permits the successful feeding of chickens from one day old to maturity. The device is inexpensive to manufacture, economical in use, prevents undue waste of feed, since the cover when opened inclines backward and acts as a guide to direct the feed to its proper place.

Also, with the use of the removable feed saving ledges which are changed according to the position of the frame, the chickens are prevented from wasting the feed and the size of the feeding openings prevents the chickens from gaining entry into the trough.

It is to be understood that various changes in construction, combination and arrangement of parts may be made within the spirit of the invention and the scope of the appended claim.

Having thus described the invention, what is claimed as new and desired to be secured by Letters Patent is:

In a chicken feeder, a trough having end walls and a central wall dividing the trough into compartments, a flat cover pivotally mounted on the end walls, a removable feeder gauge frame having side walls with portions projecting beyond the ends of the frame, the portions at one end having sections cut out of the under side thereof, the portions at the other end of the frame having sections cut out of the upper side thereof, and blocks on the end walls to support the frame, said blocks having upstanding lugs.

FINIS W. BOULWARE.

REFERENCES CITED

The following references are of record in the file of this patent:

UNITED STATES PATENTS

| Number | Name | Date |
|---|---|---|
| 1,485,672 | Fielden | Mar. 4, 1924 |
| 1,616,118 | Ellman | Feb. 1, 1927 |
| 1,808,433 | Poorman | June 2, 1931 |